(12) United States Patent
Miura et al.

(10) Patent No.: US 6,341,035 B1
(45) Date of Patent: Jan. 22, 2002

(54) CONFOCAL MICROSCOPE

(75) Inventors: Yasutada Miura, Hachioji; Nahoko Hisata, Hino, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/611,326

(22) Filed: Jul. 6, 2000

(30) Foreign Application Priority Data

Jul. 9, 1999 (JP) .......................................... 11-196733

(51) Int. Cl.[7] .......................... G02B 21/06; G02B 21/36
(52) U.S. Cl. ........................ 359/363; 359/369; 359/389
(58) Field of Search ................................ 359/363, 368, 359/369, 385, 389, 387, 235

(56) References Cited

U.S. PATENT DOCUMENTS 5,587,832 A * 12/1996 Krause ........................ 359/385

OTHER PUBLICATIONS

"nature" International Weekly Journal Of Science, vol. 383, No. 6603, Oct. 31, 1996.

\* cited by examiner

*Primary Examiner*—Jon Henry
(74) *Attorney, Agent, or Firm*—Kenyon & Kenyon

(57) ABSTRACT

A confocal microscope has a light source, an optical system, a rotating disk, an image capturing device such as a CCD camera, a subtracting section, a detector, and an adjusting device. The rotating disk has a transparent portion transmitting a light beam emitted from a light source and a light-permeable portion which includes transparent and opaque areas. The image capturing device alternately captures a composite image and a bright field image while the rotating disk is rotating. A subtracting section performs subtraction between a newest captured image and a last captured image, whenever a newest captured image is captured, so as to extract the confocal image. The detector detects at least once whether the captured image is the composite image or the bright field image. The adjusting device adjusts the plus/minus sign of the confocal image on the basis of a result detected by the detector. The confocal microscope can extract the confocal image by performing subtraction between the newest captured image and the last captured image. Thus, whenever image data is captured, the newest confocal image is displayed. The image display rate is more than twice of that of the conventional art (half of the capturing rate), so that a nearly real-time confocal image can be obtained.

16 Claims, 11 Drawing Sheets

CONFOCAL MICROSCOPE

CROSS REFERENCE TO RELATED APPLICATION

This application is based on and claims priority of Japanese Patent Application No. Hei 11-196733 filed on Jul. 9, 1999, the content of which is incorporated herein by reference.

BACKGROUND OF THE INVENTION

1. Field of the Invention

The present invention relates to a microscope. The present invention especially relates to a confocal microscope which properly measures a microscopic structure or a three dimensional structure of a sample.

2. Description of the Related Art

Traditionally, typical confocal microscopes have a disk that has a plurality of pinholes therein. For example, a disk called a ipkow-disk is used as the disk of a disk-scanning confocal microscope. The ipkow-disk has a plurality of pinholes, which are arranged in a spiral on the disk. Furthermore, pinholes of the ipkow disk are spaced a distance of about ten times the pinhole diameter. An example of a confocal microscope using an improved ipkow-disk is described by Juskaitis, T. Wilson et al. fficient real-time confocal microscopy with white light sources Nature Vol. 383, October 1996, pp. 804–806.

FIG. 10 shows a structure of the disk scanning confocal microscope described by T. Wilson et al. This disk-scanning confocal microscope uses a halogen lamp, a mercury lamp etc. as a light source 1. A collimating lens 2 and a PBS (polarizing beam splitter) 3 are disposed in the optical path of a light beam emitted from the light source 1. A sample 6 is disposed in a reflected light path of the PBS 3. The light beam is reflected by the PBS 3. Then the reflected light beam goes on to the sample 6 through a rotating disk 4 a quarter-wave plate 12 and an objective lens 5.

The collimating lens 2, the PBS 3, the quarter-wave plate 12 and the objective lens form an optical system to direct the light beam emitted from the light source 1 to the sample 6.

The rotating disk 4 is a random pinhole disk shown in FIG. 11. This disk has a random pinhole pattern portion 4a, an open portion 4b, and opaque portions 4c and 4d. The random pinhole pattern portion 4a has a plurality of pinholes, which are arranged on the disk. Furthermore, each pinhole of the disk is at a distance from another pinhole almost equal to the pinhole in diameter. The open portion 4b transmits the light beam emitted from the light source 1. The opaque portions 4c and 4d are disposed between the random pinhole pattern portion 4a and the open portion 4b.

The rotating disk (rotating object) 4 is made of a transparent circular glass. Low-reflection films made of chrome films are deposited on the transparent circular glass to form opaque portions 4c and 4d. Likewise, the random pinhole pattern portion 4a is made by depositing the low-reflection film (chrome film etc.) on the transparent circular glass except at the location of pinholes. Therefore, each opaque portion 4c, 4d and the random pinhole pattern portion 4a except the pinhole locations will shade the light beam emitted from the light source 1. The rotating disk 4 is coupled to a rotating shaft 7, which is coupled to a shaft of a motor so as to rotate shaft 7 at constant speed.

The rotating disk 4 having the pinholes can be replaced with a line pattern disk shown in FIG. 12. The line pattern disk has a line pattern portion 4e instead of the random pinhole pattern portion 4a on the transparent circular glass. The line pattern portion 4e has a plurality of lines. These lines spaced an almost constant distance each other. These lines are made by depositing the low-reflection film (chrome film etc.) to shade the light beam emitted from the light source 1. That is, the line pattern portion 4e has alternate stripes of light-opaque portions and light-permeable portions (or light-semitransparent portion).

Returning to FIG. 10, a focusing lens 8 and a CCD camera 9 are disposed in a transmitted light path of the PBS 3. The reflected light beam returns toward the PBS 3, after the light beam emitted from the light source 1 is reflected by the sample 6. The reflected light beam passes through the PBS 3, and goes on to the CCD camera 9 through the focusing lens 8. An image output-terminal of the CCD camera 9 is connected to a computer 10 so as to capture an image. After capturing the image, the computer carried out an image processing so as to display the image on the monitor 11.

By using the above structure, the light beam emitted from the light source 1 is directed to the PBS 3 through the collimating lens 2. The light beam reflected by the PBS 3 becomes rays of light incident on the rotating disk 4 which is rotated at constant speed. The light beam passing through the random pinhole pattern portion 4a (or the line pattern portion 4e) or the open portion 4b of the rotating disk 4 becomes a circularly polarized light beam by passing through the quarter-wave plate 12. Then the circularly polarized light beam is focused on the sample 6 through the objective lens 5.

The light beam reflected by the sample 6 becomes a polarized light beam which is perpendicular to the light beam incident on the sample 6 by passing through the objective lens 5 and the quarter-wave plate 12. The polarized light beam passes through the random pinhole pattern portion 4a (or the line pattern portion 4e) or the open portion 4b of the rotating disk 4 again. Then the polarized light beam transits the PBS 3, and becomes rays of light incident on the CCD camera 9 through the focusing lens 8.

Now, a timing for taking an image by means of the CCD camera 9 must be synchronized with the rotating speed of the rotating disk 4 so as to capture a composite image and a bright field image. The composite image is captured when the light beam reflected by the sample 6 is passing through the random pinhole pattern portion 4a(or the line pattern portion 4e). The bright field image is captured when the light beam reflected by the sample 6 is passing through the open portion 4b. The composite image comprises a confocal image including non-confocal components. The bright field image comprises a non-confocal image.

That is, an image stored in the CCD 9 is captured in the computer 10 as a composite image during the time of the reflected light beam passing through just about a semi-circular area of the rotating disk 4 including the random pinhole pattern portion 4a(or the line pattern portion 4e). Next, an image stored in the CCD 9 is captured in the computer 10 as a bright field image during the time the reflected light beam is passing through just about another semi-circular area of the rotating disk 4 including the open portion 4b.

After that, above two data captured sequentially are processed by a subtractive operation in the computer 10 so as to extract confocal components only. The confocal components are displayed on the monitor 11 as a confocal image. The following describes the subtractive operation with the computer 11.

(The composite image)−k×(the bright field image)=(The confocal image): k is constant Therefore, where the CCD camera 10 is a progressive scanning camera, the composite image is captured while the rotating disk 4 makes a semi-circular rotation thereof. After that, the bright field image is captured while the rotating disk 4 makes a next semi-circular rotation thereof. That is, the composite image and the bright field image are captured sequentially. Then above two captured data are processed by a subtractive operation with the computer 10 so as to extract confocal image data. The confocal image is displayed on the monitor 11. The above mentioned sequence of processes is made sequentially, and enables to display the confocal image on the monitor 11.

On the other hand, in case where the CCD camera 10 is an interlaced system camera, an image, which includes a composite image is captured from even-numbered lines of the CCD camera 10 and a bright field image is captured from odd-numbered lines of the CCD camera 10. Therefore, the confocal image is extracted by subtracting odd-numbered lines from even-numbered lines.

As mentioned above, a conventional disk-scanning confocal microscope such as T. Wilson type has a structure to rotate the rotating disk 4 to capture the composite image by passing the light beam through the random pinhole pattern portion 4a or the line pattern portion 4e, to capture the bright field image by passing the light beam through transmitting portion (the open portion 4b), and to extract the confocal image by subtracting one of the composite image and the bright field image from the other image. That is, a confocal microscope such as T. Wilson type captures the composite image and the bright field image sequentially while the rotating disk 4 makes one rotation.

However, the above conventional confocal microscope extracts a confocal image from the composite image and the bright field image, which are captured sequentially in time when the rotating disk 4 makes one rotation. That is, one image (the confocal image) is determined from two images. In other words, since the display rate of the above conventional confocal microscope is a half its capturing rate, a real-time confocal image can not be displayed on the monitor smoothly. Furthermore, since the number of horizontal lines of the image are half of the number of CCD lines, a high resolution can not be obtained.

BRIEF SUMMARY OF THE INVENTION

The present invention provides a confocal microscope which overcomes these problems. It has a light source emitting a light beam, an optical system for directing the light beam to the sample, a rotating object having a transparent portion transmitting the light beam emitted from the light source, and a light-permeable portion which has transparent and opaque areas. Also included is an element for capturing a composite image and a bright field image, the composite image including a confocal image and a non-confocal image. These are captured respectively, on the basis of the light beam passing through the light-permeable portion, and the bright field image captured on the basis of the light beam passing through the transparent portion. An operating element performs a subtraction between a newest captured image and a last image captured before the newest captured image so as to extract the confocal image whenever the operating element captures a newest image. A detecting part is disposed so as to detect whether a newest image being presently captured is the composite image or the bright field image. The composite image and the bright field image are captured alternately while the rotating object is rotating, and each of the newest captured image and the last image corresponds to either the composite image or the bright field image.

BRIEF DESCRIPTION OF THE DRAWINGS

The accompanying drawings, which are incorporated in and constitute a part of the specification, illustrate exemplary embodiments of the invention, and together with the general description above and the detailed description of illustrative embodiments given below, serve to explain the principles of the invention.

DETAILED DESCRIPTION (First Illustrative Embodiment)

Figure 1:
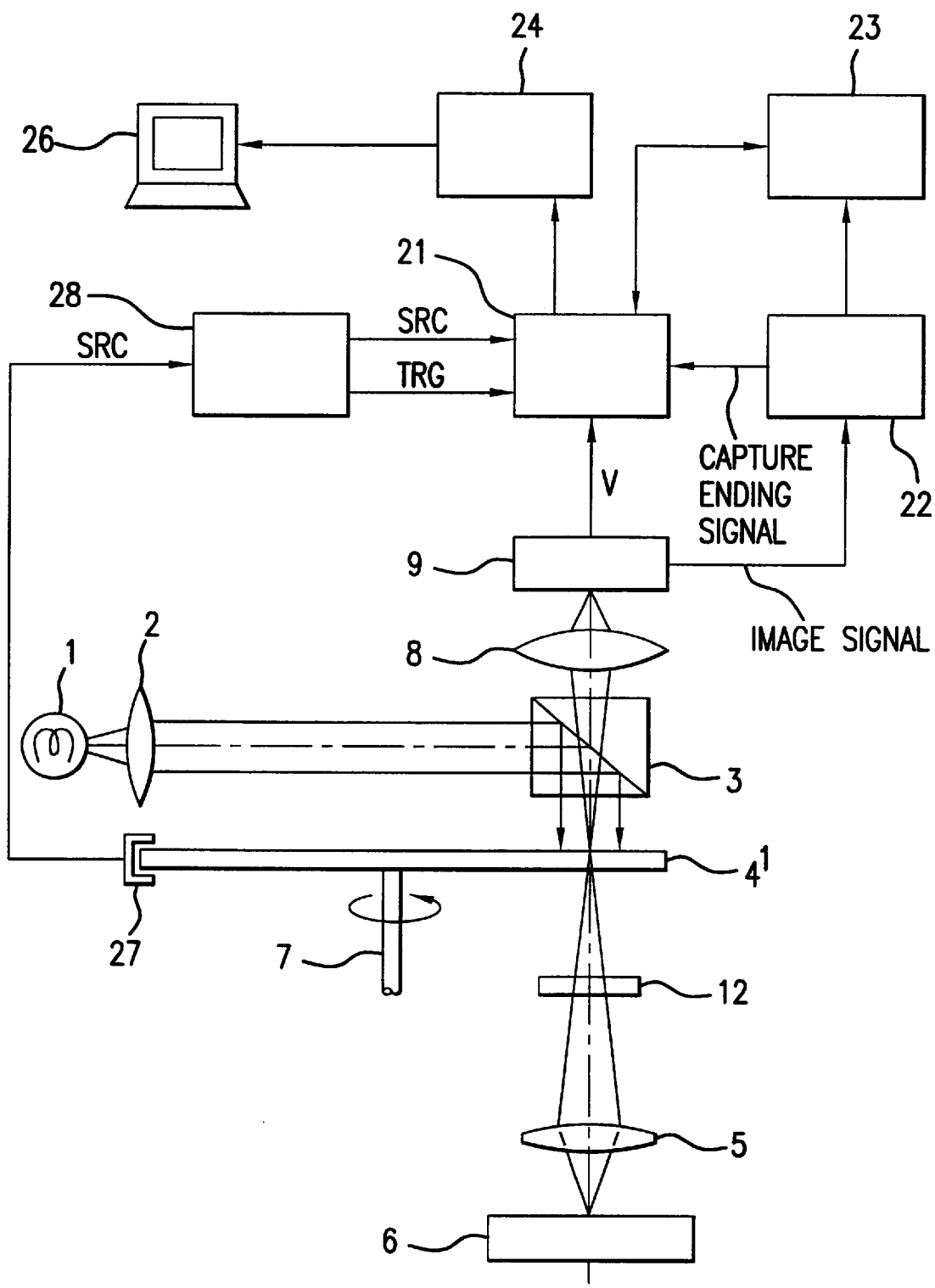
FIG. 1 shows a structure of the disk scanning confocal microscope according to a first embodiment of the invention.
Figure 10:
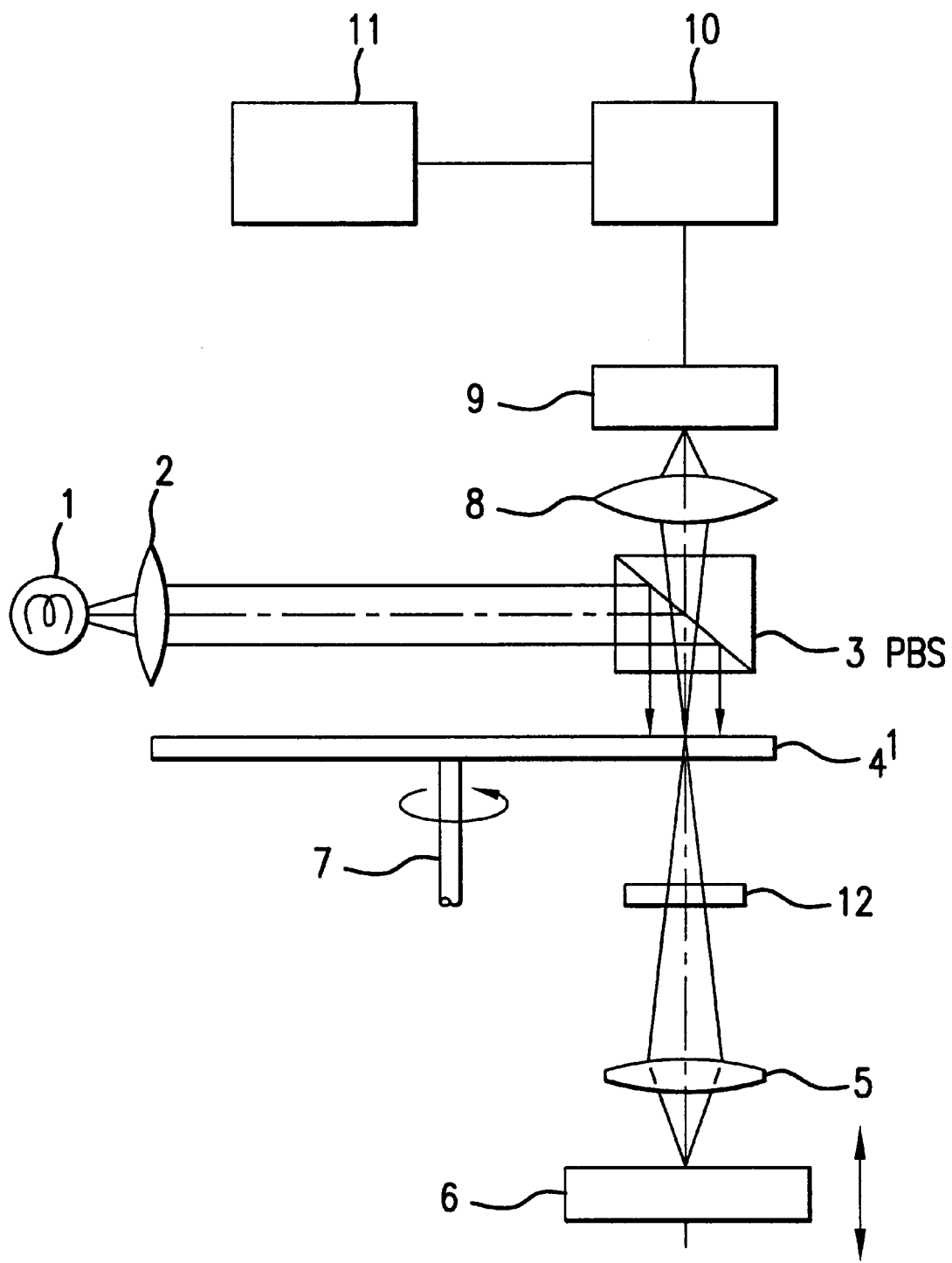
FIG. 10 shows the structure of a conventional disk scanning confocal microscope.

FIG. 1 shows a structure of a disk-scanning confocal microscope according to a first embodiment of the present invention. The components in FIG. 1 that are the same as those in FIG. 10 are given the same reference numbers and their description is omitted.

In FIG. 1, CCD camera 9 is a progressive scanning camera and outputs synchronizing signals (a vertical synchronizing signal V and a horizontal synchronizing signal H) and an image signal. The vertical synchronizing signal V is input into an operating part 21 to inform it of the start of outputting the image signal.

The image signal is input into an image capturing part 22 and captured as image data. The image capturing part 22 informs the operating part 21 whenever a predetermined amount of image data has been captured by the image capturing part 22, and it is then sequentially input into an image memory 23. The operating part 21 reads the image data out of the image memory 23, if necessary.

On the other hand, a photointerrupter 27 detects a mark indicated on an edge portion of a rotating disk 4 and produces a detection signal SRC, which is input into a trigger signal producing part 28. On the basis of the detection signal SRC, the trigger signal producing part 28 produces a trigger signal TRG for indicating that the SRC signal is in a sufficiently steady state. The SRC and TRG signals are input into the operating part 21.

Whenever the vertical synchronizing signal V from the CCD camera 9, a capture ending signal from the image capturing part 22, and the SRC and TRG signals from the trigger signal producing part 28 are respectively input, the operating part 21 performs operations for the image data of the image memory 23 and writes the resultant data into an image display memory 24, which are displayed on the monitor 26.

Figure 2:
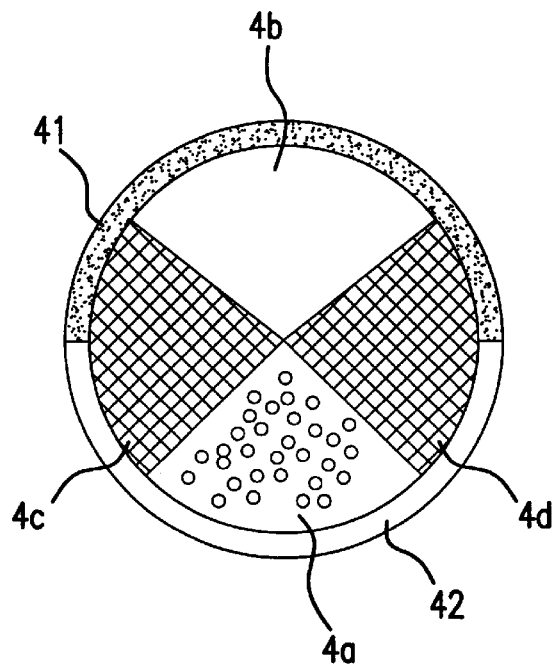
FIG. 2 shows a structure of a random pinhole disk according to the first embodiment of the invention.
Figure 3:
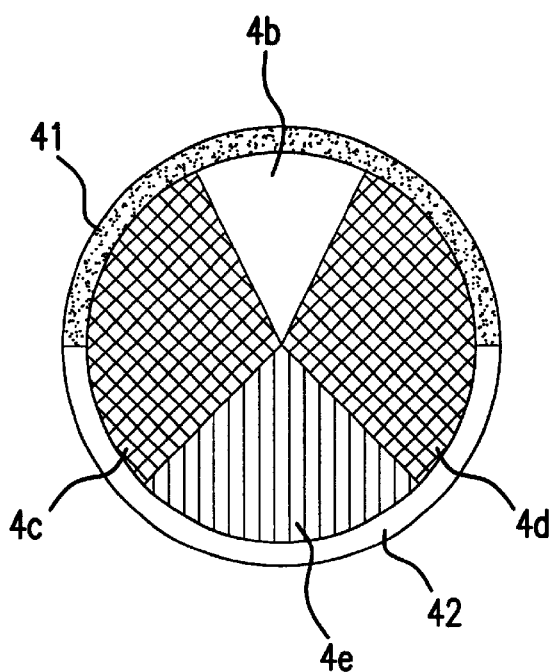
FIG. 3 shows a structure of the line pattern disk according to a first embodiment of the invention.

The rotating disk 4 is a random pinhole disk as shown in FIG. 2 or a line pattern disk as shown in FIG. 3. The basic structures of these disks are the same as those of FIGS. 11 and 12, respectively and the same portions are given the same reference numbers. Different from the conventional art is a semi-circular edge 41 including an open portion 4b with a mark that shades the light beam, and a semi-circular edge 42 including a pinhole pattern portion 4a or a line pattern portion 4e having a mark that is transparent. Accordingly, the detection signal SRC is an image classifying signal for indicating whether the image of a specimen 6 presently being input into the CCD camera 9 has passed through the open portion or the pattern portion of the rotating disk 4.

Figure 4:
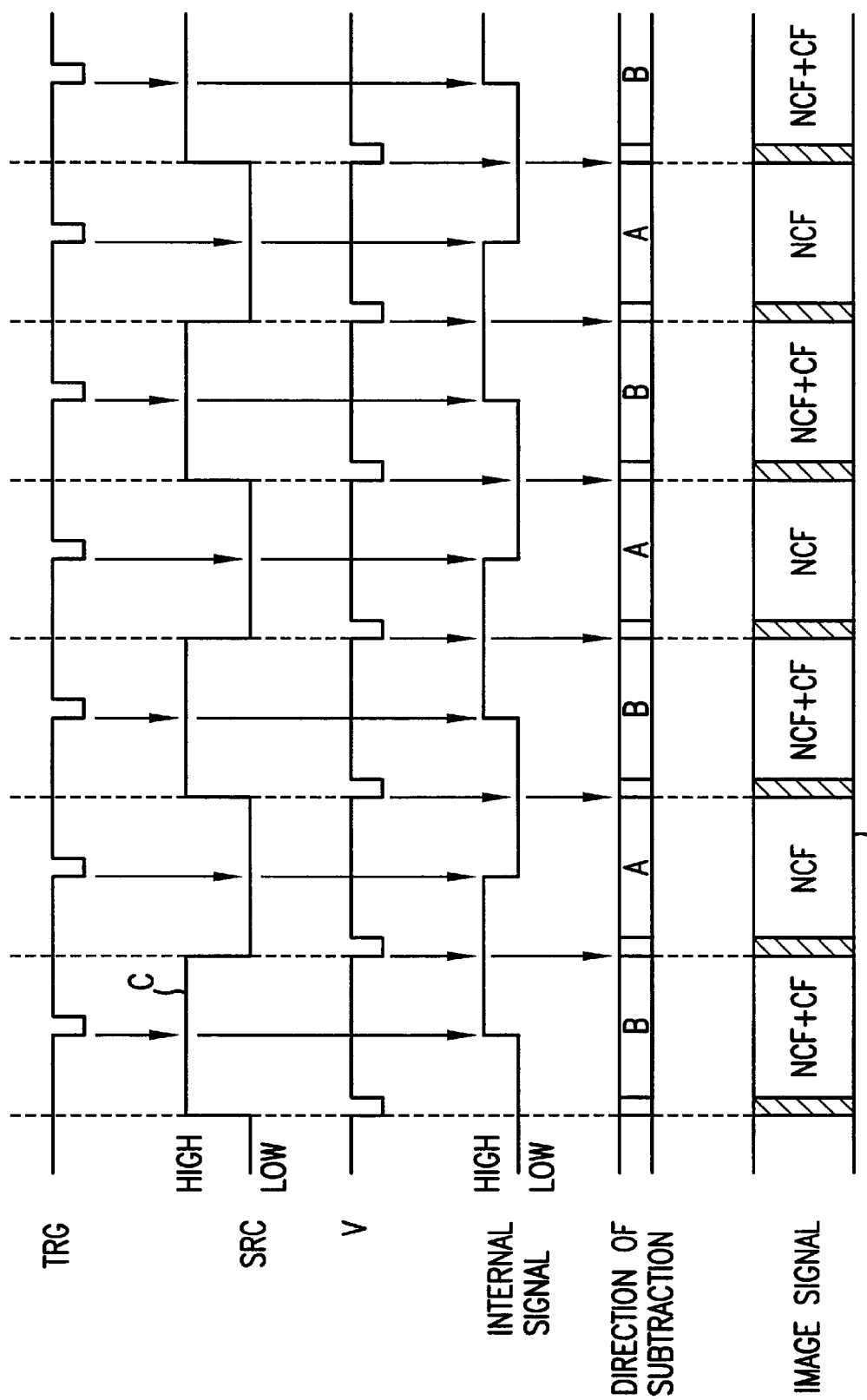
FIG. 4 is a timing chart showing a relationship of the direction of subtraction, and an image signal of a CCD camera according to the first embodiment. The timing chart shows a signal of the kind of the image, a trigger signal, and a vertical synchronizing signal and an internal signal.

FIG. 4 shows a relationship between the timing of the respective signals and the image data. Referring to FIG. 4, operations of the disk-scanning confocal microscope of FIGS. 1–3 are explained below.

When the SRC signal output from the photointerrupter 27 is low, the random pinhole pattern portion 4a (or the line pattern portion 4e) is passing through a transmitted light path of a PBS 3. Thus, the image being presently input into the CCD camera 9 is a composite image (a confocal image including non-confocal components, represented by NCF+CF in FIG. 4). When the SRC signal is high, the open portion 4b is passing through the transmitted light path of the PBS 3. Accordingly, the present image is a bright field image (a non-confocal image, represented by NCF in FIG. 4).

The CCD camera 9 stores an image during the time period of the SRC signal and outputs an image signal sequentially after a V signal. Accordingly, as shown in FIG. 4, the image kind indicated by the SRC signal is opposite to the image signal at that time: the bright field image occurring during a high period of the SRC signal (period C in FIG. 4) is captured by the image capturing part 22 during period D.

The trigger signal producing part 28 produces a TRG pulse a predetermined time after the SRC signal has changed. In synchronism with a fall of the TRG signal, the operating part 21 stores the SRC signal as an internal signal, which is renewed whenever the TRG signal is input.

Whenever the vertical synchronizing signal V is input, the operating part 21 determines, on the basis of the internal signal, the kind of the image being presently captured, decides the direction of subtraction between the image data in the image memory 23 and stores the direction of subtraction.

Figure 5:
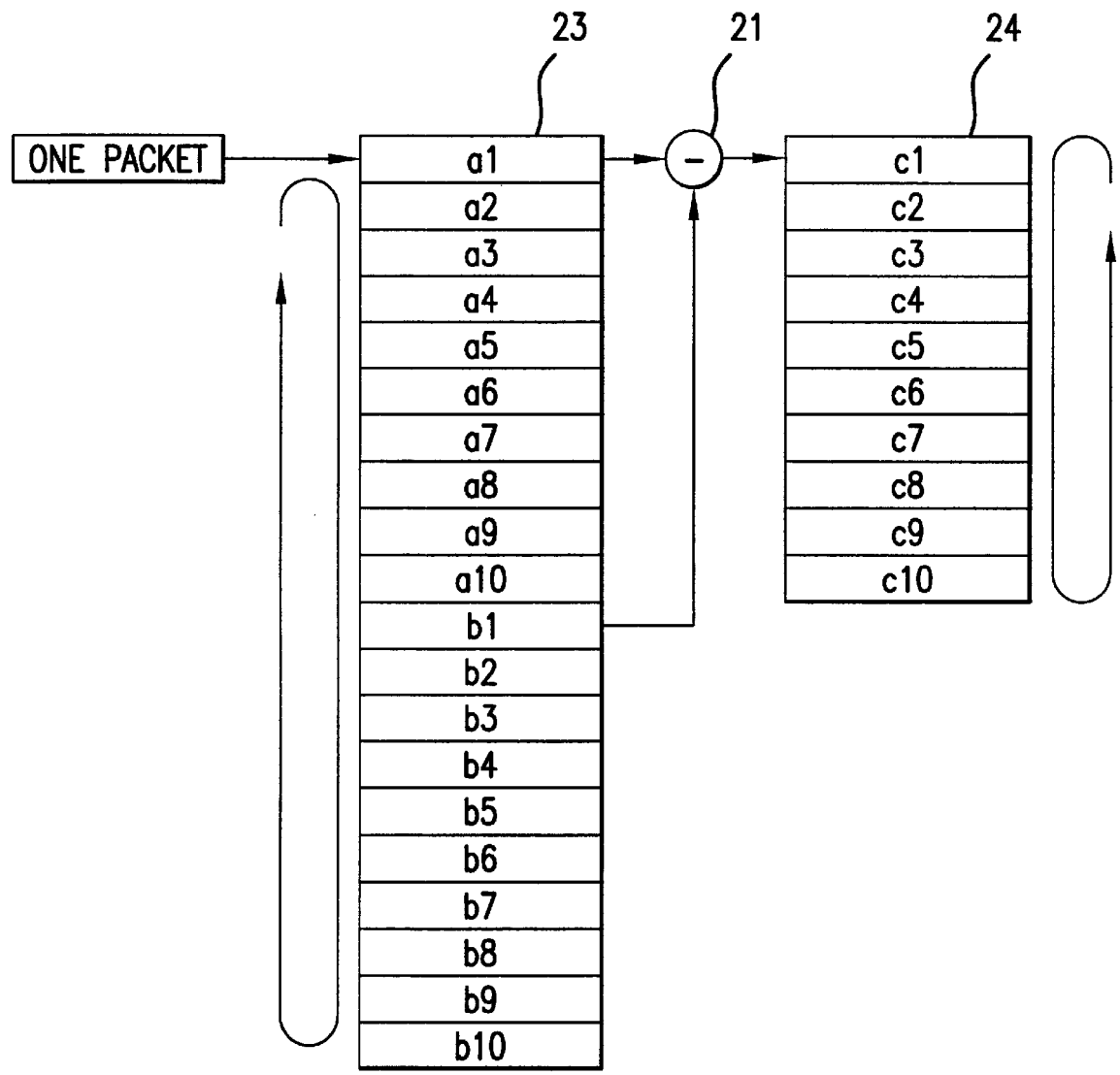
FIG. 5 shows a method for writing into an image memory and an image display memory according to the first embodiment of the invention.

The image memory 23 comprises a plurality of packets a1, a2, . . . as shown in FIG. 5. One packet represents an amount of image data that is captured by the image capturing part 22 at one time. In this embodiment, one image comprises 1000 lines and one packet comprises 100 lines: one image is formed by the image data of 10 packets. As stated above, the capture ending signal is input into the operating part 21 whenever one packet has been captured by the image capturing part 22. It is then sequentially input into the image memory 23. That is, the capture ending signal is input into the operating part 21 whenever one packet of image data is sequentially added to the image memory 23.

As shown in FIG. 5, the image memory 23 has a capacity of two images and uses its memory space ringwise such that when the added image data has reached b10, the next packet is stored in a1. Thus, the image memory 23 always stores one composite image and one bright field image, which are sequentially renewed. However, it is impossible to know only from the image memory 23 whether the composite image is stored in a1–a10 (hereinafter called area a) or b1–b10 (hereinafter called area b).

Accordingly, as stated above, in synchronism with the V signal, the operating part 21 determines, on the basis of the kind of the image being presently captured (a composite image or a bright field image, which is determined from the internal signal) and the memory area (area a or area b) into which the image data is presently stored, whether to perform the subtraction of the image being presently captured minus the image last captured (this direction of subtraction is indicated as B in FIG. 4) or the image last captured minus the image being presently captured (likewise indicated as A) for the packets being presently captured, and stores the direction of subtraction.

Concretely, if the image presently being captured is a composite image and is being stored in memory area a, the subtraction of the image presently being captured (area a) minus the image last captured (area b) is performed. Similarly, if the image presently being captured is a bright field image and is being stored in memory area b, the subtraction of the image last captured (area a) minus the image presently being captured (area b) is made. Further, if the image presently being captured is a bright field image and is being stored in memory area a, the subtraction of the image last captured (area b) minus the image presently being captured (area a) is effectuated. Finally, if the image presently being captured is a composite image and is being stored in memory area b, the subtraction of the image presently being captured (area b) minus the image last captured (area a) is carried out.

Thus, whenever the capture ending signal is input into the operating part 21, the operating part 21 reads the present packet and the corresponding packet of the last image out of the image memory 23, performs subtraction between both packets in the direction of A or B and writes one packet of the resulting confocal image data additionally into the image display memory 24. As shown in FIG. 5, the image display memory 24 has packets c1–c10 and is used ringwise such that when the additional writing has reached c10, the next writing is made in c1. The above-mentioned subtraction between the packets is completed until a next capture-ending signal is input into the operating part 21. That is, the subtraction is completed before transmission of a next packet of image data to the image memory 23 is started.

Assuming that composite image data is stored in b4, the calculation of composite image b4−k×bright field image a4 is performed. Its result is written in c4 and that image area of one packet on the monitor 26 which corresponds to c4 is renewed as the newest confocal image. By repeating this operation, the confocal image is displayed.

From FIG. 5, it appears that the bright field image is stored in area a and that the composite image is stored in area b. However, depending on the timing of image capturing, it may be that the composite image is stored in area a and that the bright field image is stored in area b. Also in this case, the above-mentioned subtraction between the images is performed correctly.

Figure 6A:
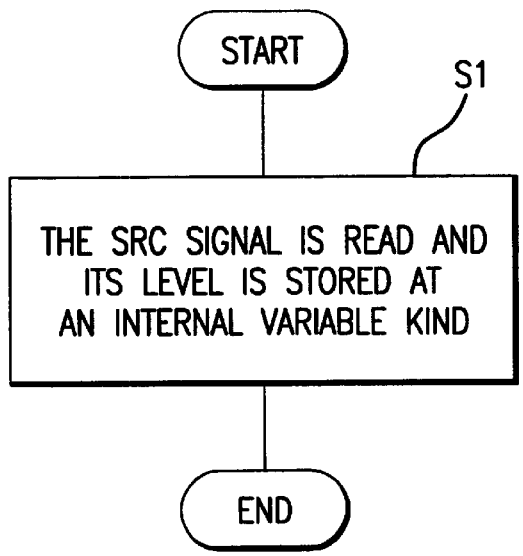
FIG. 6 shows a flow chart of the operating process according to the first embodiment of the invention.
Figure 6B:
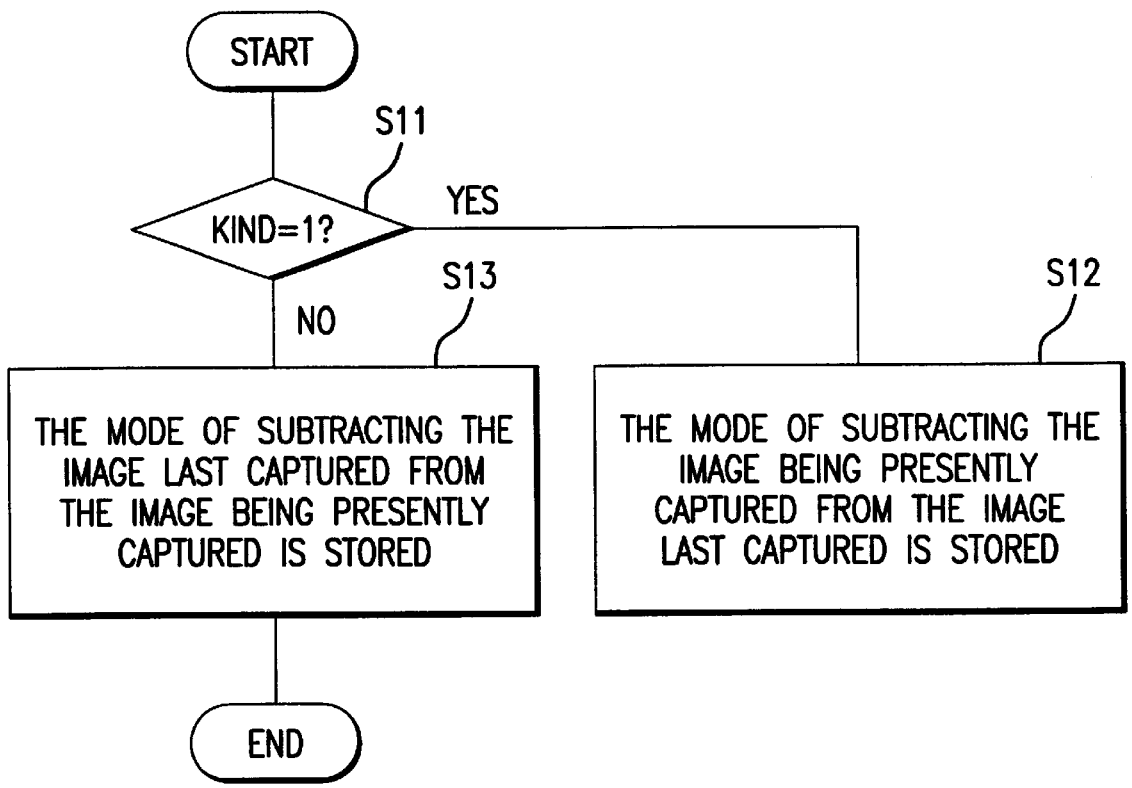
Figure 6C:
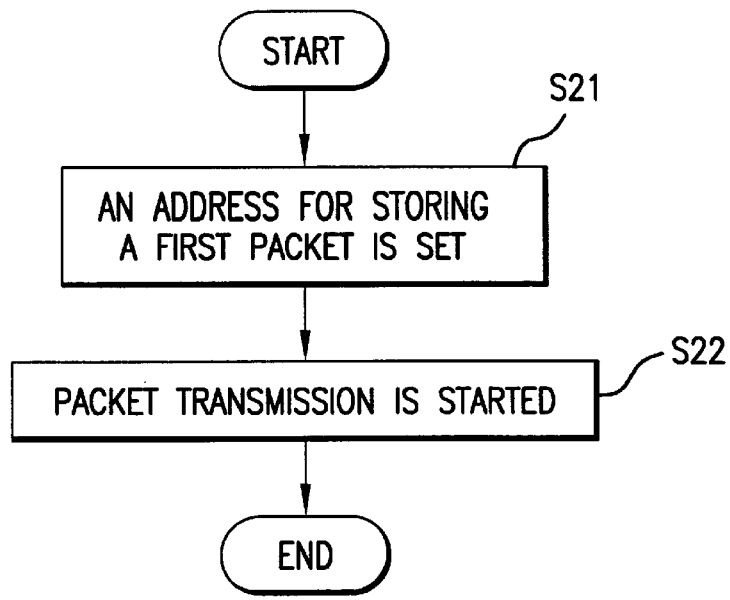

Referring to flowcharts of FIGS. 6(a) to 6(d), internal operations of the operating part 21 are explained. FIG. 6(c) shows an initializing process for starting a confocal image operation. In step S21, an address for storing a first packet (i.e. a1) is initially set. In step S22, the image capturing part 22 is allowed to start packet transmission to the image memory 23 and image capturing is started. At the same time, an interrupt process of the trigger signal (FIG. 6(a)), an interrupt process of the vertical synchronizing signal V (FIG. 6(b)), and an interrupt process of the capture ending signal (FIG. 6(d)) are enabled.

FIG. 6(a) shows the interrupt process when the trigger signal is input. In step Si, as stated above, the SRC signal is read and its level (1 for high and 0 for low) is stored at an internal variable KIND. This variable corresponds to the internal signal of FIG. 4 and represents the image kind.

FIG. 6(b) shows the interrupt process when the vertical synchronizing signal V is input. In step S11, it is determined whether the internal variable KIND is 1 or not. If it is not 1, the process goes to step 13, in which the mode of subtracting the image last captured from the image being presently captured (subtraction direction B) is stored. If it is 1, the process goes to step 12, in which another subtraction mode (subtraction direction A) is stored.

Figure 6D:
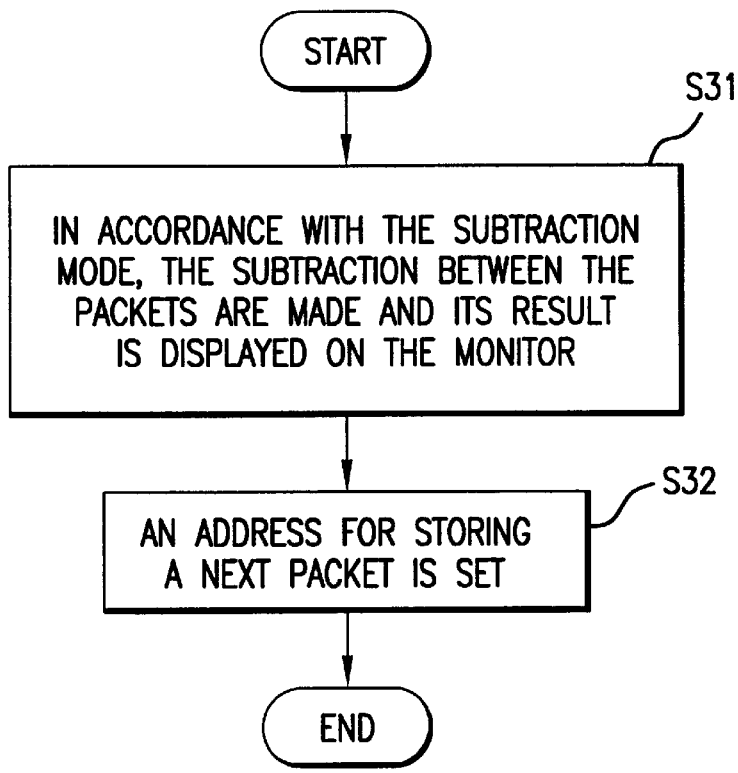

FIG. 6(d) shows the interrupt process when the capture-ending signal is input. In step S31, in accordance with the subtraction mode (A or B), the subtraction between the packets are made and its result is output to the image display memory 24 to display the image. Further, in step S32, the address for storing the next packet (a1–b10) is set.

According to the first embodiment, whenever image data is captured, the newest confocal image is displayed. The image display rate is more than twice of that of the conventional art (half of the capturing rate), so that a nearly real-time confocal image can be obtained.

By using the respective interrupt processes, a series of processes from image capturing to display can be performed by distributed processing, so that entire processing time can be shortened. In addition, operation and display per packet are possible. Accordingly, faster image display can be made.

Furthermore, the operating part 21 may comprise a computer and a program.

(Second Illustrative Embodiment)

Figure 7:
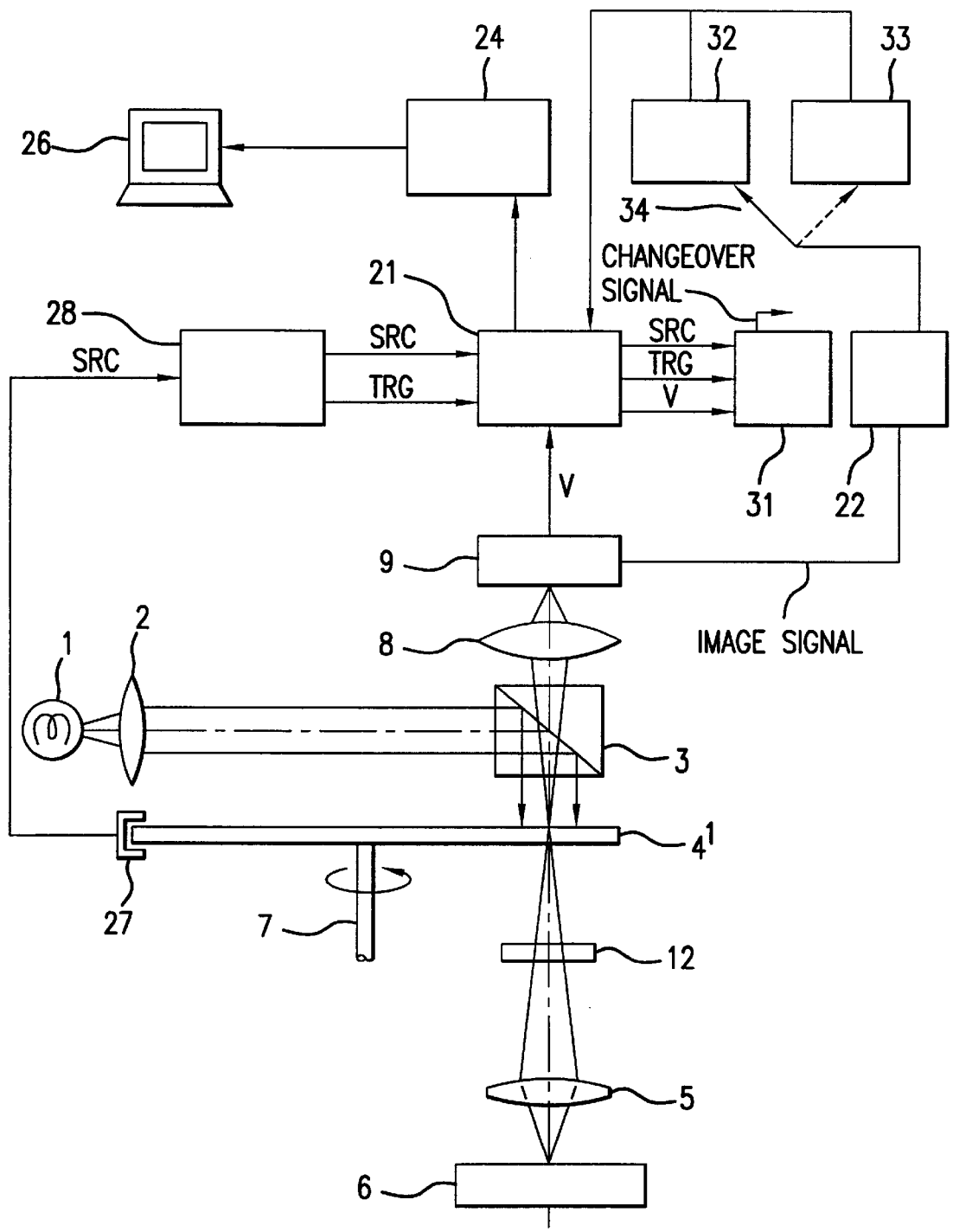
FIG. 7 shows a structure of the disk scanning confocal microscope according to a second embodiment of the invention.

FIG. 7 shows a structure of a disk-scanning confocal microscope according to a second embodiment of the present invention. The components in FIG. 7 that are the same as those in FIG. 1 are given the same reference numbers and their description is omitted.

In FIG. 7, an operating part 21 is connected to a memory changeover part 31, a first image memory 32, and a second image memory 33. Under the control of the memory changeover part 31, an image capturing part 22 can be connected to the first image memory 32 or the second image memory 33 via a switch 34.

Figure 8:
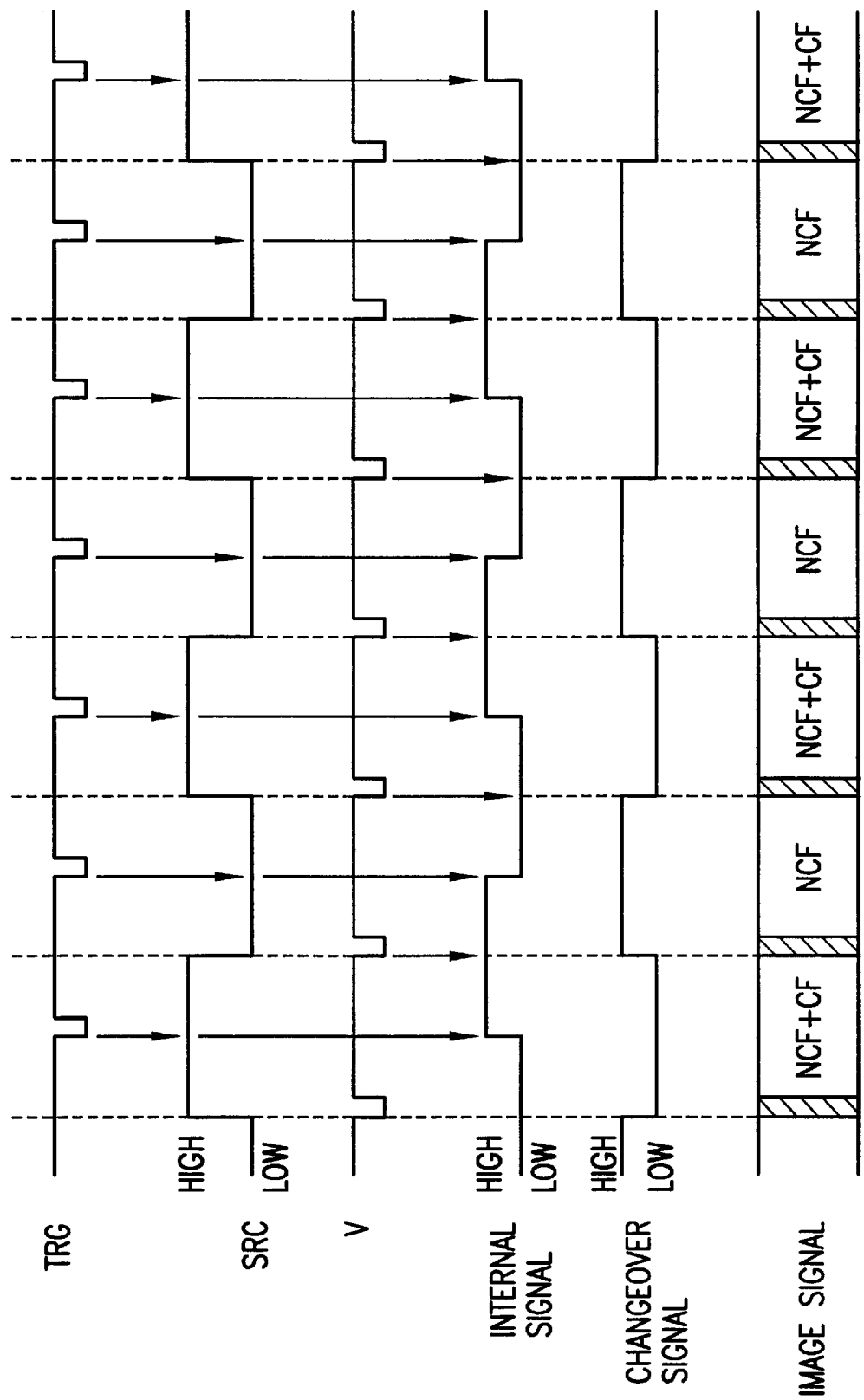
FIG. 8 is a timing chart showing a relationship of a switching signal, and an image signal according to the second embodiment. The timing chart shows a signal of the kind of the image, a trigger signal, and a vertical synchronizing signal and an internal signal.

FIG. 8 shows timing charts of SRC and TRG signals output from a trigger signal producing part 28 to the operating part 21 and from the operating part 21 to the memory changeover part 31. Also shown is a V signal output from a CCD camera 9 to the operating part 21 and from the operating part 21 to the memory changeover part 31, and an internal signal of the operating part 21. FIG. 8 also shows a relationship between a changeover signal output from the memory changeover part 31 to the switch 34 and an image signal output from the CCD camera 9 to the image capturing part 22.

In FIG. 8, the relationship among the TRG, SRC, V, internal, and image signals is the same as that shown in FIG. 4. Referring to FIG. 8, operations of the disk-scanning confocal microscope constructed as above are explained.

The operating part 21 inputs the TRG, SRC, and V signals to the memory changeover part 31. The memory changeover part 31 outputs to the switch 34 the changeover signal whose level changes in synchronism with the falling of the V signal. The level of this changeover signal is opposite to that of the SRC signal: when the SRC signal is high, the changeover signal is low, and vice versa.

While the changeover signal from the memory changeover part 31 is high, the switch 34 connects the image capturing part 22 with the first memory 32. While the signal is low, the switch 34 connects the image capturing part 22 with the second memory 33.

The first and second memories 32 and 33 each have ten memory regions, each of which can store one packet. That is, each of the first and second memories 32 and 33 stores one image. Packets are stored one by one sequentially from the first region in each of the image memories 32 and 33. When the stored packets have reached the last region, packets are stored again from the first region, that is, so to speak, ringwise.

Thus, in the first image memory 32, bright field image data are stored in the respective memory regions, then in the second image memory 33, composite image data are stored in the respective memory regions. These operations are performed alternately.

In the first image memory 32, the process is repeated to store only the bright field image data sequentially captured by the image capturing part 22. In the second image memory 33, the process is repeated to store only the composite image data sequentially captured by the image capturing part 22.

The operating part 21 calculates the difference between two packets respectively stored in the Nth memory regions (N=1 to 10) of the first and second memories 32 and 33. The direction of subtraction is preset to be from the second image memory 33 to the first image memory 32, that is, from the composite image to the bright field image. The results of the difference calculation are stored in the Nth memory region of an image display memory 24 and displayed on a monitor 26, as shown in the first embodiment.

If in the operating part 21 the direction of subtraction is preset to be from the first image memory 32 to the second image memory 33, the switch 34 connects the image capturing part 22 with the first image memory 32 when the changeover signal from the memory changeover part 31 is low. On the other hand, when the changeover signal from the memory changeover part 31 is high, the switch 34 connects the image capturing part 22 with the second image memory 33. Accordingly, the first image memory 32 stores the composite image data and the second image memory 33 stores the bright field image data, so that the operating part 21 performs the difference calculation to subtract the bright field image data from the composite image data.

With this structure, it is easy to carry out the subtraction with hardware without using software.

Conversely, although in the second embodiment the storing operations from the image capturing part 22 to the first and second image memories 32 and 33 are changed over electrically by the switch 34, the changeover may be made by software.

According to the second embodiment, whenever one image is captured, the image is always stored in one memory if it is a bright field image, and the image is always stored in the other memory if it is a composite image. Then, the difference between the packets is calculated by subtracting the packet of the one memory from the packet of the other memory. Accordingly, as in the first embodiment, whenever one image is captured, the difference between the packets of the present and last images is calculated to display the results of the calculation. Thus, two confocal images can be displayed while the disk makes one rotation, so that the image display rate can be increased to the image pickup rate.

(Third Illustrative Embodiment)

A disk-scanning confocal microscope according to a third embodiment of the present invention has the same structure as that shown in FIG. 1, except that the CCD camera 9 is an interlaced system (NTSC system).

When the CCD camera of an interlaced system is used, it is necessary for the operating part 21 to capture a first field of bright field image data (non-confocal image data) obtained from the open portion 4b of the rotating disk 4 and a second field of composite image data (confocal image data including non-confocal components) obtained from the random pinhole pattern portion 4a (or a line pattern portion 4e) and to subtract the first field from the second field.

Usually, one frame of image is obtained from the first and second fields. In the conventional confocal microscope, the difference between two lines is taken to produce one confocal line, so that every second line is skipped in the resulting confocal image. Thus, its resolution becomes half and no image of high quality can be obtained.

Figure 9:
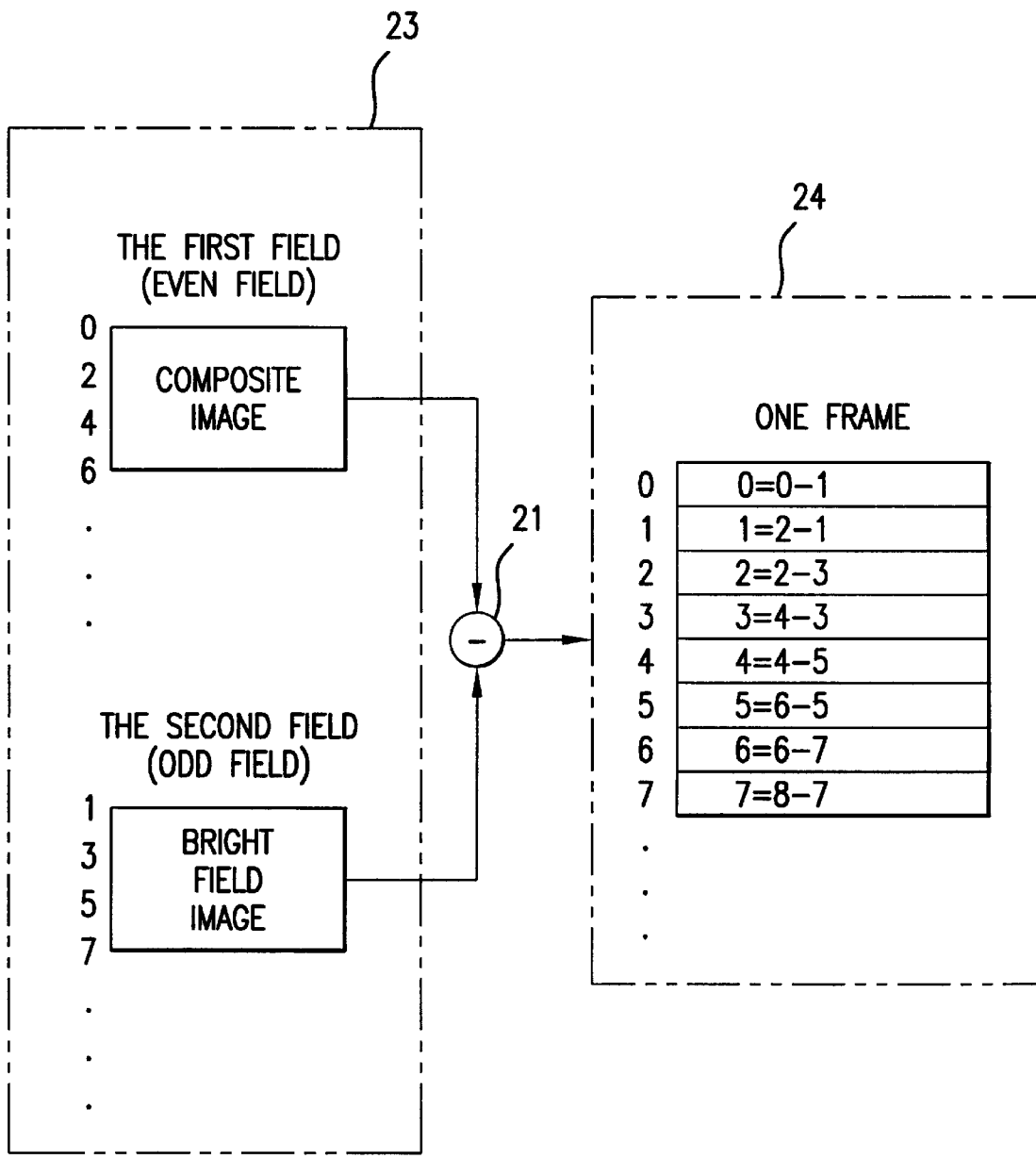
FIG. 9 shows a method for image processing according to a third embodiment of the invention.

In the confocal microscope of the third embodiment, the image capturing part 22 shown in FIG. 1 captures one frame of image composed of the first field (odd field) of bright field image data and the second field (even field) of composite image data and stores them in the image memory 23 as shown in FIG. 9. That is, in the image memory 23, the composite image data and the bright field image data are stored line by line. The first and second fields in the third embodiment correspond respectively to the bright field image and the composite image shown in the first and second embodiments.

The operating part 21 determines the direction of subtraction between two adjacent lines of image data stored in the image memory 23 such that the direction of subtraction alternates corresponding to the high and low levels of the SRC signal as in the first embodiment, and calculates the difference between the two lines. That is, as shown in FIG. 9, the operating part 21 subtracts line 1 from line 0, the result of which is new line 0, then line 1 from line 2, the result of which is new line 1, then line 3 from line 2, the result of which is new line 2, then line 3 from line 4, the result of which is new line 3, and so forth, and sequentially outputs the respective subtracted data to the image display memory 24.

The subtracted data stored in the image display memory 24 are sequentially transmitted to the monitor 26 and one frame of confocal image represented by the subtracted data is displayed.

Accordingly, this confocal microscope can display a confocal image in which all lines are artificially filled, so that the number of lines in the vertical direction is not reduced to half as in the conventional art. Thus, a confocal image of high resolution and high quality can be obtained.

The present invention is not limited to the above embodiments, and various changes and modifications may be made without departing from the spirit and scope of the invention.

(Modifications)

(1) In the first embodiment, the direction of subtraction between area a and area b can be fixed to one direction and the sign of the result of the subtraction can be alternated on the basis of the SRC signal so that the plus/minus sign of the image obtained becomes correct.

(2) As stated, in the first embodiment, the direction of subtraction may be preset, for example, such that the present image is subtracted from the last image when the SRC signal is high. The subsequent direction of subtraction is always opposite to the last direction. Accordingly, after reading the level of the first SRC signal and determining the direction of subtraction, the operating part 21 may subtract always in the direction opposite to the last direction automatically without reading the level of the SRC signal.

(3) In the first and second embodiments, the monitor 26 may be provided with two display areas: one of them is to display a confocal image and the other is for a bright field image. In this case, a memory area for storing bright field image data is added to the image display memory 24, and the operating part 21 outputs subtracted data and bright field image data used in the subtraction to the image display memory 24. Thus, the monitor 26 can display a confocal image and a bright field image side by side at the same time so that the bright field image, which is effective in, for example, positioning a specimen, can be referred to while the confocal image is observed.

(4) In the second embodiment, the image memory may be of the same type as the image memory 23 shown in FIG. 5. As in the first embodiment, the memory is used ringwise such that the captured image data is stored sequentially from packet a1, and when the image data has reached the last packet b10, the next image data is stored in the first packet a1. In this case, for example, areas a and b of the image memory 23 correspond to the first and second memories 32 and 33, respectively.

Figure 11:
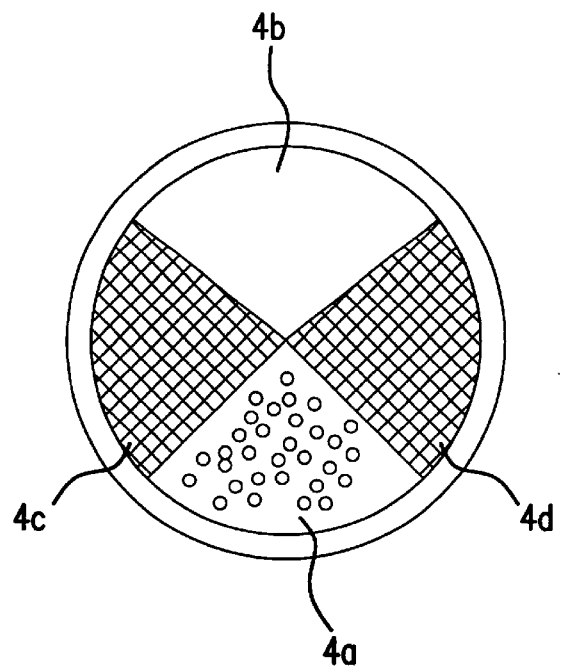
FIG. 11 shows a structure of a conventional random pinhole disk.
Figure 12:
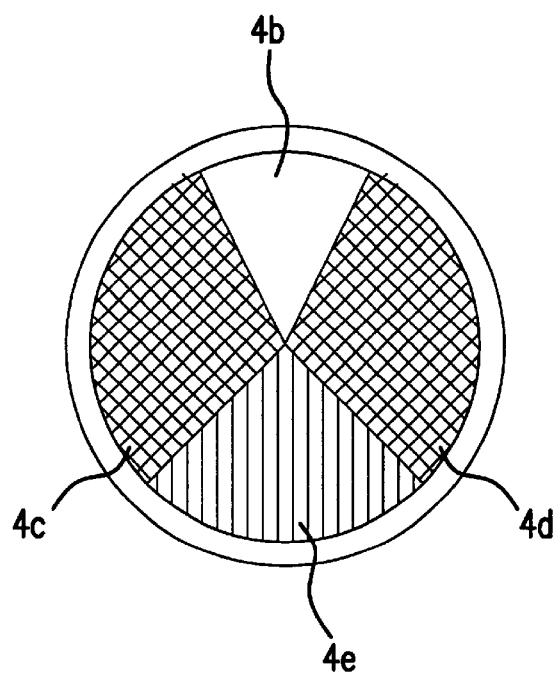
FIG. 12 shows a structure of a conventional line pattern disk.

When the rotating disk of FIG. 11 is used to obtain confocal images, the bright field images NCF and the composite images NCF+CF are always obtained alternately. Therefore, if by using the SRC signal for indicating the types of images, timing for starting image capture is determined in such a manner that the image data is stored in the first packet of the first memory when the type of the image is the NCF image, then the NCF image data and the NCF+CF are always stored in the first image memory (i.e. area a of the memory 23) and the second image memory (i.e. area b of the memory 23), respectively. In this case, it is possible to omit the memory changeover part 31 and fix the direction of subtraction such that the first image memory (area a of the memory 23) is subtracted from the second image memory (area b of the memory 23), so as to obtain confocal images.

What is claimed is:

1. A confocal microscope comprising:

a light source emitting a light beam;

an optical system for directing the light beam to the sample;

a rotating object having a transparent portion transmitting the light beam emitted from the light source, and a light-permeable portion which includes transparent and opaque area;

an element for capturing a composite image and a bright field image, the composite image including a confocal image and a non-confocal image which are captured on the basis of the light beam passing through the light-permeable portion, and the bright field image captured on the basis of the light beam passing through the transparent portion;

an operating element for performing subtraction between the composite image and the bright field image, which are captured alternately while the rotating object is rotating, so as to extract the confocal image;

a detecting part disposed so as to detect whether a newest image being presently captured is the composite image or the bright field image;

a memory for storing the newest image and a last image captured before the newest image;

an image display memory for storing an image data to display on a monitor; and determining section for determining the direction of subtraction between the newest image and the last image on the basis of the newest image kind;

wherein the operating element performs the subtraction according to the direction of subtraction determined by the determining section whenever the newest image is captured, and then writes a result of subtraction into the image display memory.

2. The confocal microscope according to claim 1, wherein the element for capturing uses a progressive scanning camera.

3. The confocal microscope according to claim 2, wherein each of the composite image and the bright field image is divided into a plurality of packets, transmitted per packet to the memory, and stored in the memory.

4. The confocal microscope according to claim 3, wherein the operating element performs the subtraction between a packet of the composite image and a packet of the bright field image before transmission of a next packet of the newest image to the memory is started.

5. The confocal microscope according to claim 3, wherein the operating element performs the subtraction between a packet of the composite image and a packet of the bright field image when transmission of those packets to the memory has been completed.

6. The confocal microscope according to claim 4, wherein the detecting part carries out an interrupt process to detect an image kind when the detecting part receives a trigger signal which shows a change of an image kind, the determining section carries out an interrupt process to determine the direction of subtraction when the determining section receives a vertical synchronizing signal of the element for capturing, and the operating element carries out an interrupt process to perform the subtraction between packets according to the direction of subtraction which has been determined by the determining section when the operating element receives a capture ending signal which shows completion of transmitting one packet to the memory is input into the operating element.

7. The confocal microscope according to claim 6, wherein the rotating object has a mark to discriminate between the transparent portion and the light-permeable portion, and the detecting part detects the mark and determines the image kind.

8. The confocal microscope according to claim 1, wherein the element for capturing uses an interlaced system camera, the camera having odd and even fields in one frame, the composite image and the bright field image are stored in the odd field and the even field alternately, and the operating element performs subtraction between the odd field and the even field.

9. The confocal microscope according to claim 8, wherein each of the composite image and the bright field image is divided into a plurality of packets, each of which is transmitted per packet to the memory, and the operating element performs the subtraction before transmitting a next packet of the newest image to the memory is started.

10. The confocal microscope according to claim 8, wherein each of the composite image and the bright field image is divided into a plurality of packets, each of which is transmitted per packet to the memory, and the operating element performs the subtraction between a packet of the composite image and a packet of the bright field image when transmission of those packets to the memory has been completed.

11. The confocal microscope according to claim 9, wherein the detecting part carries out an interrupt process to detect a image kind when the detecting part receives a trigger signal which shows a change of an image kind, the determining section carries out an interrupt process to determine the direction of subtraction when the determining section receives a vertical synchronizing signal of the element for capturing, and the operating element carries out an interrupt process to perform the subtraction between packets according to the direction of subtraction which has been determined by the determining section when the operating element receives a capture ending signal which shows completion of transmitting one packet to the memory.

12. The confocal microscope according to claim 8, wherein the operating element performs subtraction as explained below so as to write the result of subtraction in lines of the image display memory:

in case of a total number of lines equal to (n+2), each line data of the even field is numbered as $d0, d2, d3, d4, dn$, each data of line of the odd field is numbered as $d1, d3, d5, d(n+1)$, and each field of the image display memory corresponding to lines on the monitor is numbered as $D0, D1, D2, D3, Dn, D(n+1)$, $(d0-d1)$ is written into $D0$, $(d2-d1)$ is written into $D1$, $(d2-d3)$ is written into $D2$, $(d4-d3)$ is written into $D3$, $(d4-d5)$ is written into $D4$, $(dn-d(n-1))$ is written into $D(n-1)$, and $(dn-d(n+1))$ is written into $Dn$, with the direction of subtraction determined by the determining section.

13. A confocal microscope comprising:

a light source emitting a light beam;

an optical system for directing the light beam to the sample;

a rotating object having a transparent portion transmitting the light beam emitted from the light source, and a light-permeable portion which includes transparent and opaque areas;

an element for capturing a composite image and a bright field image, the composite image including a confocal image and a non-confocal image which are captured on the basis of the light beam passing through the light-permeable portion, and the bright field image captured on the basis of the light beam passing through the transparent portion;

an operating element for performing subtraction between a newest captured image and a last image captured before the newest captured image so as to extract the confocal image whenever the operating element captures a newest image;

a detecting part disposed so as to detect whether a newest image being presently captured is the composite image or the bright field image;

wherein the composite image and the bright field image are captured alternately while the rotating object is rotating, and each of the newest captured image and the last image corresponds to either the composite image or the bright field image.

14. The confocal microscope according to claim 13, wherein the operating element reverses the direction of subtraction alternately on the basis of a result obtained by the detecting part.

15. The confocal microscope according to claim 13, further comprising:

a memory having a first image memory part and a second image memory part, each of the first image memory part and the second image memory part storing one image captured by the element for capturing;

a switch for alternately dividing images captured by the element for capturing between the first image memory part and the second image memory part;

wherein the operating element always subtracts the second image memory part from the first image memory part, and the switch is set to store the composite image in the first image memory part on the basis of the result gotten by the detecting part.

16. The confocal microscope according to claim 13, further comprising:

a memory having a first image memory part and a second image memory part, each of the first image memory part and the second image memory part storing one image captured by the element for capturing;

a switch for alternately dividing images captured by the element for capturing between the first image memory part and the second image memory part;

wherein the operating element always subtracts the second image memory part from the first image memory part, and the switch is set to direct images alternately according to a first captured image kind, in the case where the first captured image kind is the composite image, the first captured image is stored in the first image memory part, in the case where the first captured image kind is the bright field image, the first captured image is stored in the second image memory part, captured images after a second captured image are stored in the first image memory part and the second image memory part alternately.

* * * * *